United States Patent
Phillips

(10) Patent No.: US 12,045,287 B2
(45) Date of Patent: Jul. 23, 2024

(54) DYNAMICALLY-QUALIFIED AGGREGATE RELATIONSHIP SYSTEM IN GENEALOGICAL DATABASES

(71) Applicant: Ancestry.com Operations Inc., Lehi, UT (US)

(72) Inventor: Jeff Phillips, Alpine, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 0 days.

(21) Appl. No.: 17/730,480

(22) Filed: Apr. 27, 2022

(65) Prior Publication Data
US 2022/0253484 A1    Aug. 11, 2022

Related U.S. Application Data

(63) Continuation of application No. 15/393,665, filed on Dec. 29, 2016, now Pat. No. 11,347,798.

(51) Int. Cl.
*G06F 16/901* (2019.01)
*G06F 16/28* (2019.01)

(52) U.S. Cl.
CPC ........ *G06F 16/9027* (2019.01); *G06F 16/285* (2019.01)

(58) Field of Classification Search
CPC ............................ G06F 16/9027; G06F 16/285
See application file for complete search history.

(56) References Cited

U.S. PATENT DOCUMENTS

| | | | | |
|---|---|---|---|---|
| 7,870,139 B2 * | 1/2011 | Cookson, Jr. | ......... | G06F 16/211 |
| | | | | 707/754 |
| 9,116,882 B1 | 8/2015 | Macpherson et al. | | |
| 2001/0041327 A1 * | 11/2001 | Gross | ..................... | G09B 19/00 |
| | | | | 434/154 |
| 2004/0189691 A1 | 9/2004 | Jojic et al. | | |
| 2005/0102270 A1 * | 5/2005 | Risvik | ................... | G06F 16/951 |
| 2005/0147947 A1 * | 7/2005 | Cookson | ................. | G06F 16/20 |
| | | | | 434/154 |
| 2007/0149216 A1 * | 6/2007 | Misikangas | ......... | G01S 5/02524 |
| | | | | 455/456.1 |
| 2007/0266003 A1 | 11/2007 | Wong et al. | | |

(Continued)

OTHER PUBLICATIONS

Bezerianos, et al. GeneaQuilts: A System for Exploring Large Genealogies, IEEE Transactions on Visualization and Computer Graphics, vol. 16, No. 6, Nov./Dec. 2010, pp. 1073-1081. (Year: 2010).*

*Primary Examiner* — Cheyne D Ly
(74) *Attorney, Agent, or Firm* — Fenwick & West LLP

(57) ABSTRACT

Methods and systems for creating a cluster view person for genealogical studies. Methods may include obtaining a plurality of genealogical trees. Each of the genealogical trees may include a plurality of interconnected nodes representing individuals that are related to each other. Methods may also include identifying one or more of the genealogical trees that contain a similar individual. Whether two individuals are grouped may depend on similarity and/or quality thresholds. Methods may include creating an aggregate individual including each of the similar individuals in each of the identified genealogical trees. The aggregate individual may combine information from each of the similar individuals.

20 Claims, 12 Drawing Sheets

(56) References Cited

U.S. PATENT DOCUMENTS

| | | | |
|---|---|---|---|
| 2008/0081331 A1* | 4/2008 | Myres | G16B 20/00 |
| | | | 702/20 |
| 2012/0054190 A1* | 3/2012 | Peters | G06T 3/40 |
| | | | 707/812 |
| 2012/0078503 A1* | 3/2012 | Dzubay | G06Q 10/10 |
| | | | 701/410 |
| 2013/0305356 A1* | 11/2013 | Cohen-Ganor | H04L 63/1416 |
| | | | 726/22 |
| 2014/0052763 A1* | 2/2014 | Sato | G06F 16/21 |
| | | | 707/805 |
| 2014/0278138 A1 | 9/2014 | Barber et al. | |
| 2016/0048517 A1 | 2/2016 | Jensen | |
| 2017/0213127 A1 | 7/2017 | Duncan | |
| 2017/0293861 A1 | 10/2017 | Roy et al. | |

* cited by examiner

FIG. 4

Tree Person A15
   (Score: 500, Quality: 700)
   John Doe
   Male
   Birth: 1/1/1900 SLC, UT
   Death: 1/1/1950 SLC, UT

Tree Person B13
   (Score: 900, Quality: 300)
   Jonathan Doe
   Male
   Birth: 1/1/1900 SLC, UT
   Death: 1/1/1951 SLC, UT

Tree Person C5
   (Score: 800, Quality: 100)
   Johnny Doe
   Male
   Birth: 1/1/1900 SLC, UT
   Death: 1/1/1951 SLC, UT

Tree Person D45
   (Score: 400, Quality: 700)
   John Doe
   Male
   Birth: 1/1/1900 SLC, UT
   Death: 1/1/1950 SLC, UT

Tree Person E135
   (Score: 150, Quality: 150)
   Jonny Doe
   Male
   Birth: 1/1/1900 SLC, UT
   Death: 1/1/1952 SLC, UT

Tree Person F287
   (Score: 650, Quality: 500)
   Jonathan Doe
   Male
   Birth: 1/1/1900 SLC, UT
   Death: 1/1/1952 SLC, UT 502a FILTERS:
Score ≥ 100
Quality ≥ 100

504a

Cluster View Person 1000
   John Doe
      Contributor: Tree Person A15
      Contributor: Tree Person D45
   Jonathan Doe
      Contributor: Tree Person B13
      Contributor: Tree Person F287
   Johnny Doe
      Contributor: Tree Person C5
   Jonny Doe
      Contributor: Tree Person E135
   Male
      Contributor: Tree Person A15
      Contributor: Tree Person B13
      Contributor: Tree Person C5
      Contributor: Tree Person D45
      Contributor: Tree Person E135
      Contributor: Tree Person F287
   Birth: 1/1/1900 SLC, UT
      Contributor: Tree Person A15
      Contributor: Tree Person B13
      Contributor: Tree Person C5
      Contributor: Tree Person D45
      Contributor: Tree Person E135
      Contributor: Tree Person F287
   Death: 1/1/1950 SLC, UT
      Contributor: Tree Person A15
      Contributor: Tree Person D45
   Death: 1/1/1951 SLC, UT
      Contributor: Tree Person B13
      Contributor: Tree Person C5
   Death: 1/1/1952 SLC, UT
      Contributor: Tree Person E135
      Contributor: Tree Person F287

FIG. 5A

Tree Person A15
(Score: 500, Quality: 700)
John Doe
Male
Birth: 1/1/1900 SLC, UT
Death: 1/1/1950 SLC, UT

Tree Person B13
(Score: 900, Quality: 300)
Jonathan Doe
Male
Birth: 1/1/1900 SLC, UT
Death: 1/1/1951 SLC, UT

Tree Person C5 ~~(crossed out)~~
(Score: 800, Quality: 100)
Johnny Doe
Male
Birth: 1/1/1900 SLC, UT
Death: 1/1/1951 SLC, UT

Tree Person D45
(Score: 400, Quality: 700)
John Doe
Male
Birth: 1/1/1900 SLC, UT
Death: 1/1/1950 SLC, UT

Tree Person E135 ~~(crossed out)~~
(Score: 150, Quality: 150)
Jonny Doe
Male
Birth: 1/1/1900 SLC, UT
Death: 1/1/1952 SLC, UT

Tree Person F287
(Score: 650, Quality: 500)
Jonathan Doe
Male
Birth: 1/1/1900 SLC, UT
Death: 1/1/1952 SLC, UT 502b FILTERS:
Score ≥ 200
Quality ≥ 200

504b

Cluster View Person 1000
John Doe
    Contributor: Tree Person A15
    Contributor: Tree Person D45
Jonathan Doe
    Contributor: Tree Person B13
    Contributor: Tree Person F287
~~Johnny Doe~~
    ~~Contributor: Tree Person C5~~
~~Jonny Doe~~
    ~~Contributor: Tree Person E135~~
Male
    Contributor: Tree Person A15
    Contributor: Tree Person B13
    ~~Contributor: Tree Person C5~~
    Contributor: Tree Person D45
    ~~Contributor: Tree Person E135~~
    Contributor: Tree Person F287
Birth: 1/1/1900 SLC, UT
    Contributor: Tree Person A15
    Contributor: Tree Person B13
    ~~Contributor: Tree Person C5~~
    Contributor: Tree Person D45
    ~~Contributor: Tree Person E135~~
    Contributor: Tree Person F287
Death: 1/1/1950 SLC, UT
    Contributor: Tree Person A15
    Contributor: Tree Person D45
Death: 1/1/1951 SLC, UT
    Contributor: Tree Person B13
    ~~Contributor: Tree Person C5~~
Death: 1/1/1952 SLC, UT
    ~~Contributor: Tree Person E135~~
    Contributor: Tree Person F287

FIG. 5B

Tree Person A15
(Score: 500, Quality: 700)
John Doe
Male
Birth: 1/1/1900 SLC, UT
Death: 1/1/1950 SLC, UT ~~Tree Person B13~~
~~(Score: 900, Quality: 300)~~
~~Jonathan Doe~~
~~Male~~
~~Birth: 1/1/1900 SLC, UT~~
~~Death: 1/1/1951 SLC, UT~~

~~Tree Person C5~~
~~(Score: 800, Quality: 100)~~
~~Johnny Doe~~
~~Male~~
~~Birth: 1/1/1900 SLC, UT~~
~~Death: 1/1/1951 SLC, UT~~

~~Tree Person D45~~
~~(Score: 400, Quality: 700)~~
~~John Doe~~
~~Male~~
~~Birth: 1/1/1900 SLC, UT~~
~~Death: 1/1/1950 SLC, UT~~

~~Tree Person E135~~
~~(Score: 150, Quality: 150)~~
~~Jonny Doe~~
~~Male~~
~~Birth: 1/1/1900 SLC, UT~~
~~Death: 1/1/1952 SLC, UT~~

Tree Person F287
(Score: 650, Quality: 500)
Jonathan Doe
Male
Birth: 1/1/1900 SLC, UT
Death: 1/1/1952 SLC, UT 502c FILTERS:
Score ≥ 500
Quality ≥ 500

504c

Cluster View Person 1000
  John Doe
    Contributor: Tree Person A15
    ~~Contributor: Tree Person D45~~
  Jonathan Doe
    ~~Contributor: Tree Person B13~~
    Contributor: Tree Person F287
  ~~Johnny Doe~~
    ~~Contributor: Tree Person C5~~
  ~~Jonny Doe~~
    ~~Contributor: Tree Person E135~~
  Male
    Contributor: Tree Person A15
    ~~Contributor: Tree Person B13~~
    ~~Contributor: Tree Person C5~~
    ~~Contributor: Tree Person D45~~
    ~~Contributor: Tree Person E135~~
    Contributor: Tree Person F287
  Birth: 1/1/1900 SLC, UT
    Contributor: Tree Person A15
    ~~Contributor: Tree Person B13~~
    ~~Contributor: Tree Person C5~~
    ~~Contributor: Tree Person D45~~
    ~~Contributor: Tree Person E135~~
    Contributor: Tree Person F287
  Death: 1/1/1950 SLC, UT
    Contributor: Tree Person A15
    ~~Contributor: Tree Person D45~~
  ~~Death: 1/1/1951 SLC, UT~~
    ~~Contributor: Tree Person B13~~
    ~~Contributor: Tree Person C5~~
  Death: 1/1/1952 SLC, UT
    ~~Contributor: Tree Person E135~~
    Contributor: Tree Person F287

FIG. 5C

| ITEM | SUB-ITEM | SCORE | QUALITY |
|---|---|---|---|
| Item A | | | |
| | Sub-Item 1 | 100 | 80 |
| | Sub-Item 2 | 90 | 75 |
| | Sub-Item 3 | 80 | 70 |
| | Sub-Item 4 | 70 | 80 |
| | Sub-Item 5 | 60 | 75 |
| | Sub-Item 6 | 50 | 70 |
| | Sub-Item 7 | 40 | 80 |
| Item B | | | |
| | Sub-Item 8 | 90 | 55 |
| | Sub-Item 9 | 90 | 40 |
| | Sub-Item 10 | 80 | 40 |
| | Sub-Item 11 | 80 | 55 |
| | Sub-Item 12 | 70 | 55 |
| | Sub-Item 13 | 70 | 40 |
| | Sub-Item 14 | 70 | 80 |

700

| ITEM | SUB-ITEM | SCORE | QUALITY |
|---|---|---|---|
| Item A | | | |
| | Sub-Item 1 | 100 | 80 |
| Item B | | | |
| | Sub-Item 8 | 90 | 55 |
| | Sub-Item 9 | 90 | 40 |
| | Sub-Item 10 | 80 | 40 |
| | Sub-Item 11 | 80 | 55 |
| | Sub-Item 14 | 70 | 80 |

900

DYNAMICALLY-QUALIFIED AGGREGATE RELATIONSHIP SYSTEM IN GENEALOGICAL DATABASES

CROSS-REFERENCE TO RELATED APPLICATIONS

The present application is a continuation of U.S. patent application Ser. No. 15/393,665 filed on Dec. 29, 2016, which is hereby incorporated by reference.

BACKGROUND OF THE INVENTION

In certain genealogical or family history databases, ancestor data is stored in trees which contain one or more persons or individuals. Trees may also include intra-tree relationships which indicate the relationships between the various individuals within a certain tree. In many cases, persons in one tree may correspond to persons in other trees, as users have common ancestors with other users. One challenge in genealogical databases has been dealing with duplicate persons with data that do not perfectly align. This problem arises due to discrepancies between different historical records, discrepancies between historical records and human accounts, and discrepancies between different human accounts. For example, different users having a common ancestor may have different opinions as to the name, dates of birth, and place of birth of that ancestor. The problem becomes particularly prevalent when large amounts of historical documents are difficult to read, causing a wide range of possible personal information. Therefore, there is a need for improved techniques in the area.

BRIEF SUMMARY OF THE INVENTION

Embodiments of the present invention include a method for creating a cluster view person. The method may include obtaining a plurality of genealogical trees. In some embodiments, each of the plurality of genealogical trees includes a plurality of interconnected nodes representing individuals that are related to each other. The method may also include identifying one or more genealogical trees of the plurality of genealogical trees that contain a similar individual. In some embodiments, two different individuals in two different genealogical trees are determined to be similar based on a comparison between the two different individuals and a similarity threshold. Furthermore, the method may include creating an aggregate individual comprising each of the similar individuals in each of the identified genealogical trees. In some embodiments, the aggregate individual combines information from each of the similar individuals.

In some embodiments, the combined information from each of the similar individuals includes one or more of the following: a name, a gender, a date of birth, a location of birth, a date of death, and a location of death. The method may also include determining a statistic of the combined information from each of the similar individuals. The method may further include displaying, by a display device, the aggregate individual by displaying the statistic. In some embodiments, the method includes ranking the combined information from each of the similar individuals from most frequent to least frequent. In some embodiments, the similarity threshold is dynamically adjustable by an end user. In some embodiments, the similarity threshold is automatically adjusted by a processor.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 4 illustrates a cluster view person, according to an embodiment of the present disclosure.

FIGS. 5A-5C illustrate various cluster view persons with various filters, according to an embodiment of the present disclosure.

Figure 1:
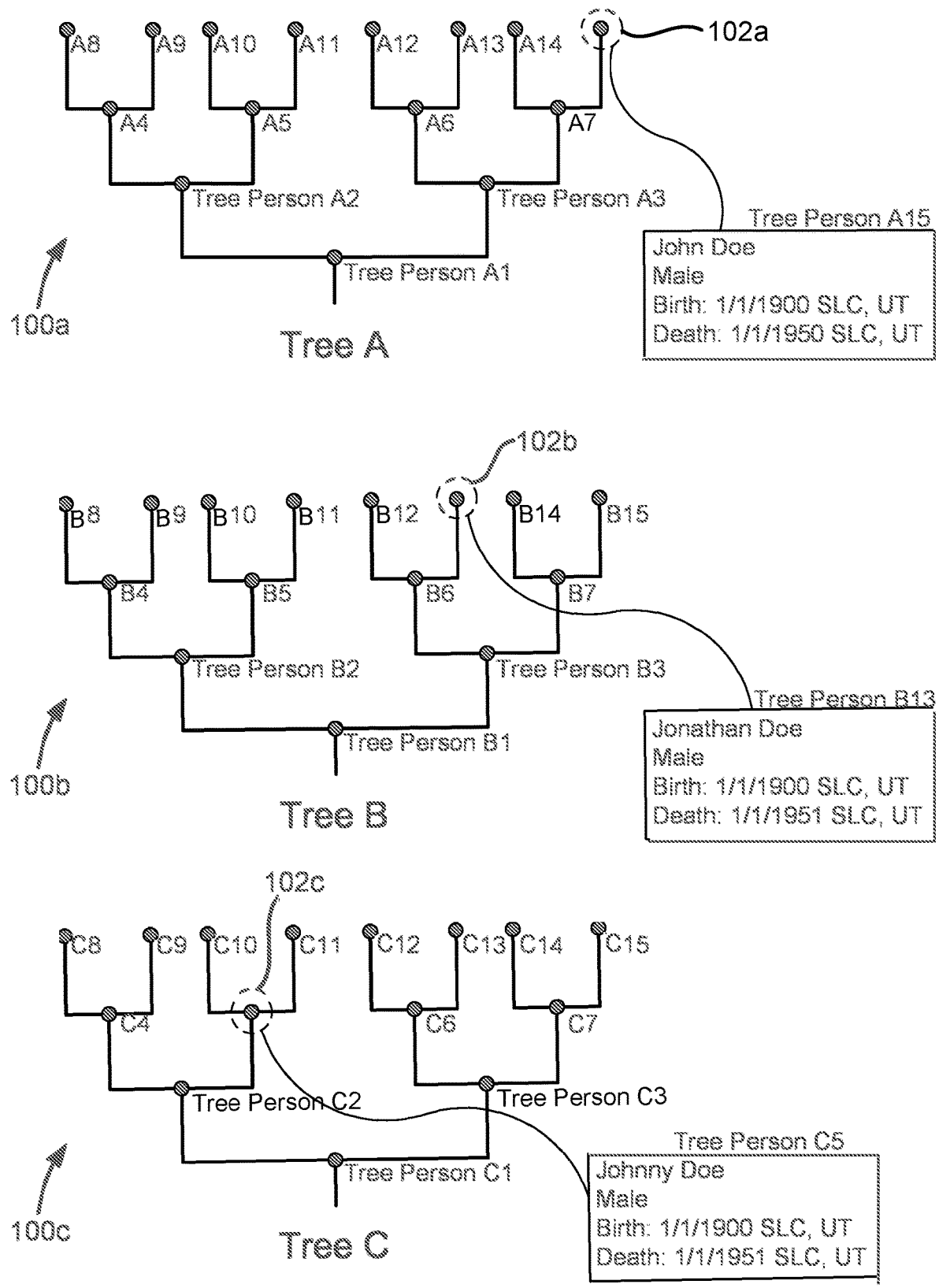
FIG. 1 illustrates various family trees having a similar individual, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Genealogical databases often contain huge amounts of information that include trees, persons, and intra-tree relationships among persons. Many trees contain persons that correspond to persons in other trees, as users have common ancestors with other users. The advantage of identifying these duplicate or corresponding persons is that one user may have information for their ancestor that another user does not. As more duplicate persons are identified, rather than list every duplicate person for the user to browse, it may be more helpful to show a user an aggregation of all the duplicates merged together in a single, concise view of the cluster (i.e., a group of duplicate persons).

Additionally, persons in a cluster have varying degrees of data quality/completeness, as well as similarity with other persons in the cluster. Users or external systems often have different preferences when utilizing an aggregate view of a cluster. Some prefer to have high-quality or high-similarity in their view (which limits the content viewable within a cluster). Others prefer to have a larger view of the cluster by allowing persons with less quality or lower similarity (which increases the content viewable within a cluster). Embodiments of the present disclosure allow users and external systems to specify the degree of similarity and/or quality they would like to allow in their view.

The present disclosure describes systems, methods, and other techniques for allowing users or external systems to utilize an aggregate view of a cluster (called a cluster view person), as well as customize their view according to similarity and/or quality thresholds. The present disclosure allows users to avoid browsing through thousands of individual tree persons of a cluster, which can be cumbersome and impractical, particularly for large clusters.

Definitions

As used herein, the terms "tree", "family tree", and "genealogical tree" may be used interchangeably and may refer to a finite number of related individuals that are interconnected in the tree according to their relationships. Two individuals that are directly connected in a tree may be in a parent-child relationship, in a sibling relationship, or in some other relationship. A tree may be displayed as various points connected by lines. The base or bottom of the tree may comprise a single individual, which may or may not be a user of the tree.

As used herein, the terms "tree person", "person", "individual", and "node" may be used interchangeably and may refer to a living or deceased human being that is represented in a tree.

As used herein, the term "user" may refer to an owner or creator of a tree, or may refer to any entity, human or non-human, that is currently using a tree or genealogical database in some manner.

As used herein, the term "cluster" may refer to a grouping of tree persons. Although clusters are designed to group various tree persons that correspond to the same actual human being, this is not always possible, and often clusters are either overinclusive or underinclusive based on some similarity threshold that is employed.

As used herein, the terms "cluster view person" and "aggregate individual" may be used interchangeably and may refer to an aggregate view of a cluster and/or may refer to a grouping of tree persons according to some similarity threshold and/or quality threshold. Unlike a cluster, a cluster view person does not necessarily attempt to aggregate all tree persons that correspond to the same actual human being. A user may desire to manipulate a cluster view person such that a smaller subset of tree persons are viewable in the cluster view person in a useful way. A cluster view person may differ from a cluster both in the way tree persons are selected (generally based on similarity and/or quality thresholds) and in the way the data derived from the tree persons is presented and viewed.

Dynamically-Qualified Aggregate Relationship System

FIG. 1 illustrates family trees 100*a-c*, each having similar individuals 102*a-c*, according to an embodiment of the present disclosure. Trees 100*a-c* are also denoted as Trees A, B, and C, respectively. Trees A, B, and C may be owned by, created by, and/or used by Tree Persons A1, B1, and C1, or by some other users unrelated to Trees A, B, and C. In some embodiments, it may be determined that Tree Person A15 (named "John Doe"), Tree Person B13 (named "Jonathan Doe"), and Tree Person C5 (named "Johnny Doe") correspond to the same person based on their similarity. Although a user of Tree A may understand Tree Person A15 to be John Doe, it may be beneficial to that user to become aware of the information discovered by the users of Trees B and C, who understand John Doe to in fact have a differently spelled name and a different date of death. Similarly, users of Trees B and C may benefit to know of alternate spellings and dates of death for Tree Persons B13 and C5, whom they understand to be Jonathan Doe and Johnny Doe. Therefore, to assist users of Trees A, B, and C in their genealogical research, it is often advantageous to group together similar tree persons into a cluster and/or a cluster view person.

Figure 2:
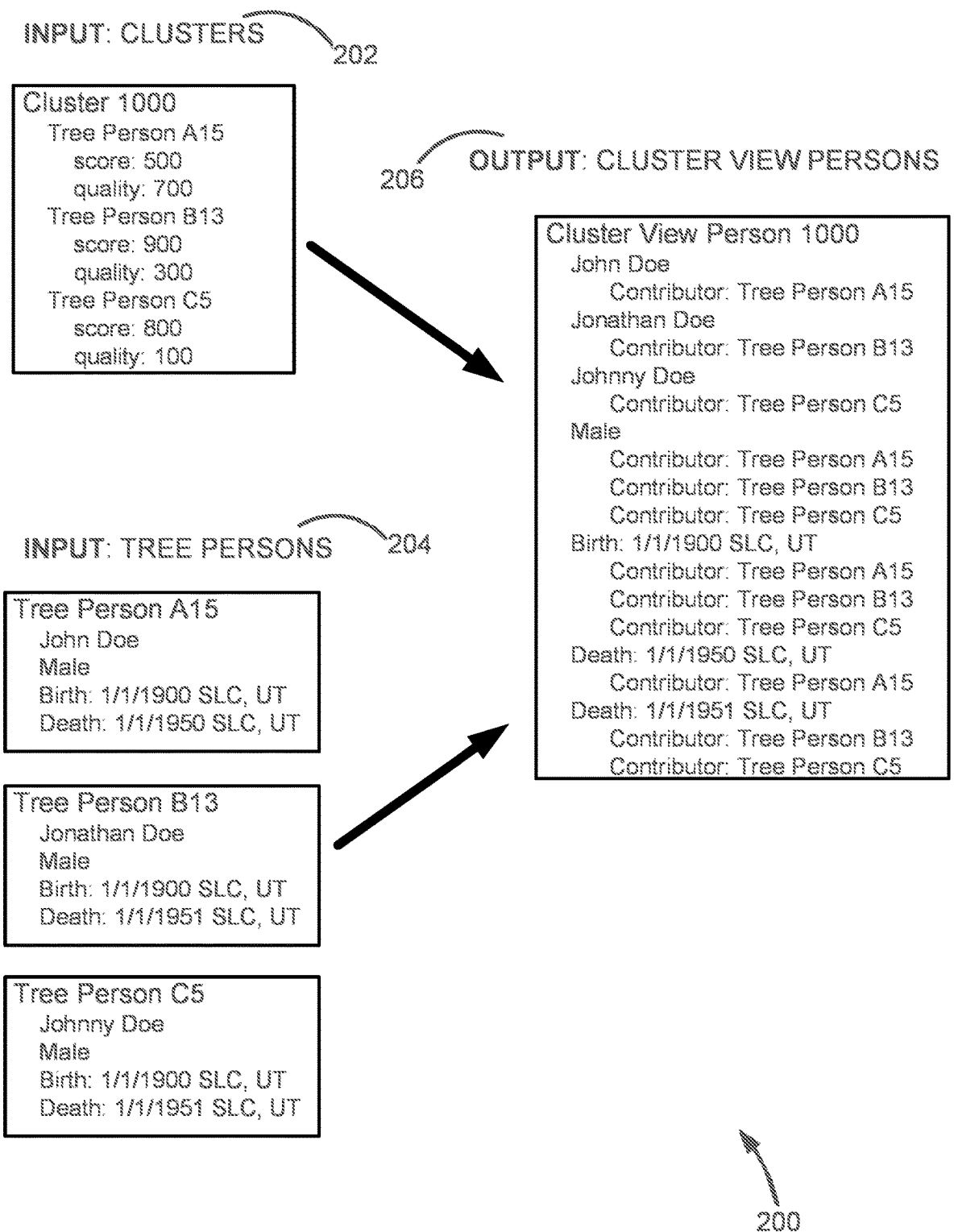
FIG. 2 illustrates a block diagram showing a relationship between clusters, tree persons, and cluster view persons, according to an embodiment of the present disclosure.

FIG. 2 illustrates a block diagram 200 showing a relationship between clusters 202, tree persons 204, and cluster view persons 206, according to an embodiment of the present disclosure. Clusters 202 and tree persons 204 may serve as inputs in the creation of a cluster view person. In some embodiments, each tree person in a cluster is numerically assigned a score and a quality. For example, in Cluster 1000, Tree Person A15 is assigned a score of 500 and a quality of 700, Tree Person B13 is assigned a score of 900 and a quality of 300, and Tree Person C5 is assigned a score of 800 and a quality of 100.

In some embodiments, the score of a tree person is the similarity between the tree person and the other tree persons in the cluster. For example, in some embodiments, a centroid (i.e., average position of all data points) is calculated for the combination of all the tree persons in a cluster, and the score for each tree person is inversely proportional to the distance between the tree person and the centroid. For example, a tree person that is closer to the centroid would have a higher score than a tree person that is further from the centroid.

In some embodiments, the quality of a tree person is related to the quantity and quality of the historical records and other evidence in support of the information contained in the tree person. The quality of a tree person may also be related to the completeness of the tree person, which is the amount of information defined for that tree person, e.g., name, date of birth, place of birth, and the like. While clusters may have a similarity threshold to determine which tree persons should be grouped together in a cluster, this similarity threshold is not necessarily equal to the similarity threshold for the cluster view person to determine which tree persons should be included in the cluster view person. The similarity threshold for the cluster view person may be higher, lower, or equal to the similarity threshold for a cluster. In some embodiments, cluster view persons 206 are not based on clusters 202 but rather are developed solely from tree persons 204.

Cluster View Person 1000 includes each of Tree Persons A15, B13, and C5 arranged in order of quality. For example, because Tree Person A15 has a higher quality than Tree Person B13, John Doe is displayed/listed above Jonathan Doe and the date of death of Jan. 1, 1950 is displayed/listed above Jan. 1, 1951. Similarly, because Tree Person B13 has a higher quality than Tree Person C5, Jonathan Doe is displayed above Johnny Doe. In other embodiments, tree persons may not be arranged in order of quality, but may be ordered in a number of different ways, including score and frequency (quantity of other tree persons with identical information).

Figure 3:
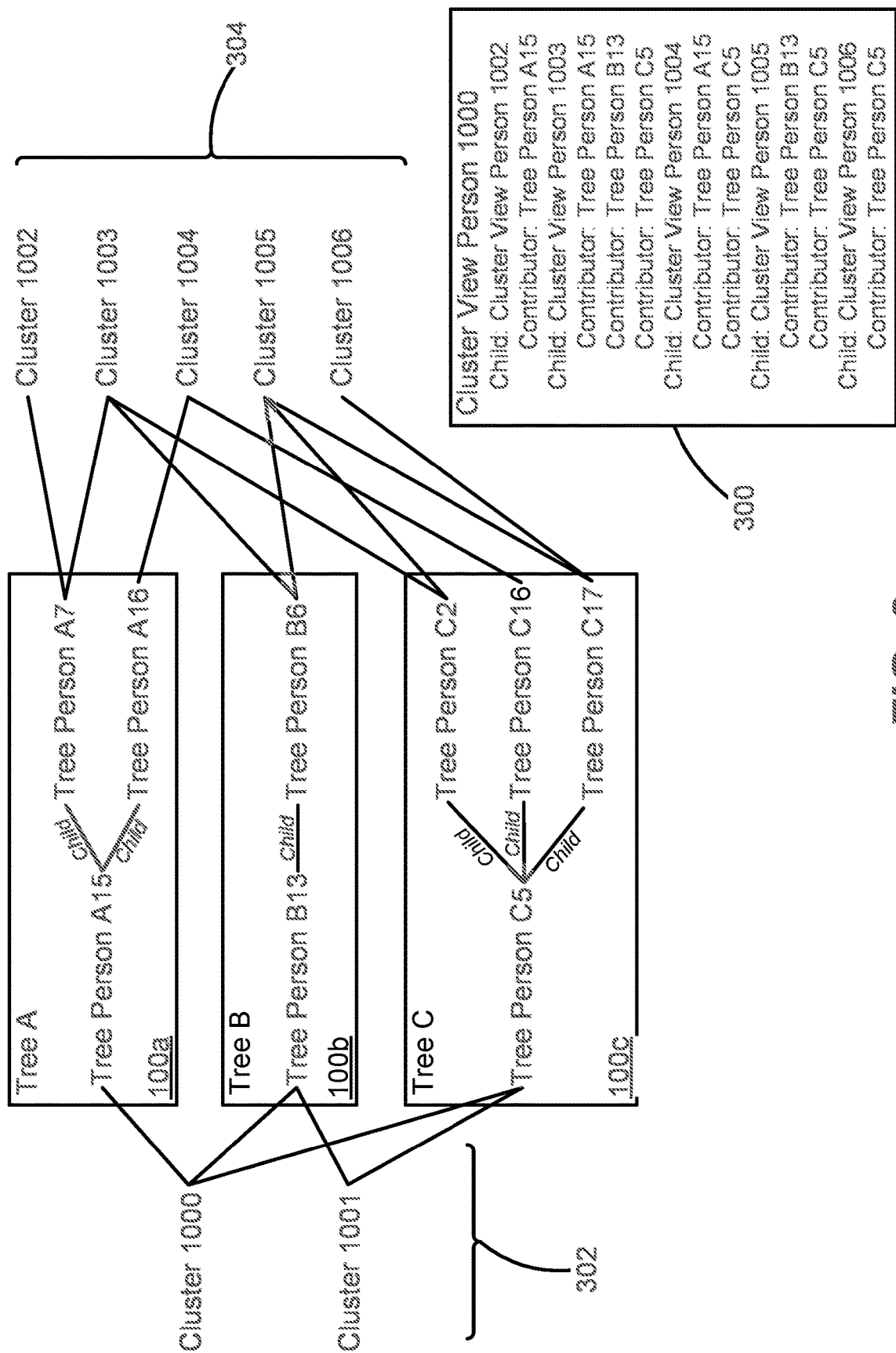
FIG. 3 illustrates a cluster view person, according to an embodiment of the present disclosure.

FIG. 3 illustrates a cluster view person 300 denoted as Cluster View Person 1000, according to an embodiment of the present disclosure. In some embodiments, a cluster view person may display its relatives in terms of other cluster view persons. For example, while Cluster View Person 1000 includes three tree persons (Tree Persons A15, B13, and C5), each of those tree persons may have children that are different. The children of Tree Persons A15, B13, and C5 may be grouped into different clusters, and each of those different clusters may comprise a cluster view person. For example, after parent clusters 302 and child clusters 304 are created, cluster view persons for each parent cluster may be created in terms of child clusters 304. Cluster View Person 1000 includes as children Cluster View Persons 1002, 1003, 1004, 1005, and 1006, and Cluster View Person 1001 (not shown) includes as children Cluster View Persons 1003, 1004, 1005, and 1006 (note that Cluster 1002 does not include any tree persons from Tree B or Tree C). Parent clusters 302 and child clusters 304 may be dependent on the similarity threshold selected, and may therefore modify Cluster View Person 1000 as the threshold is changed.

Figure 4:
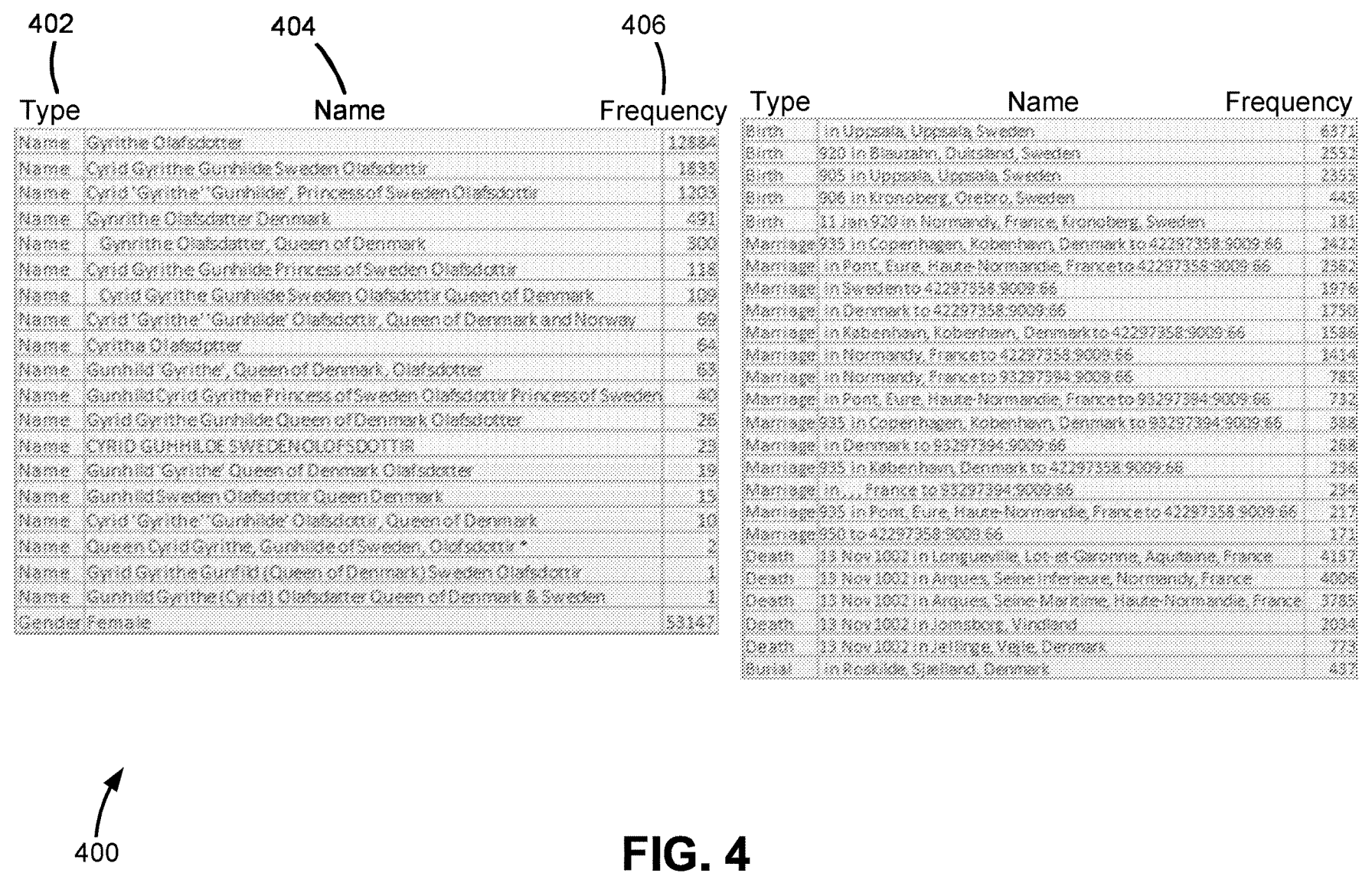

FIG. 4 illustrates a cluster view person 400, according to an embodiment of the present disclosure. Cluster view person 400 is displayed according to type 402, name 404, and frequency 406. Certain statistics may be computed and displayed within a cluster view person. For example, a frequency 406 may be computed for the number of tree persons that include a certain type 402 and name 404. In cluster view person 400, the name "Gyrithe Olafsdotter" appears in 12,884 tree persons while other names appear significantly less. Cluster view persons that display statistics may facilitate a user in better understanding and visualizing amounts of genealogical information.

FIGS. 5A-5C demonstrate how a user may specify a wide range of filters to modify a cluster view person, according to various embodiments of the present disclosure. In FIG. 5A, a user may decide that they want to view a large number of possible versions (tree persons) of the ancestor they are researching. The user may specify filter 504*a* to indicate that only tree persons with scores equal to or greater than 100 and qualities equal to or greater than 100 be used, causing all of tree persons 502*a* to be included in Cluster View Person 1000.

In FIG. 5B, a user may decide that they want to view a moderate number of possible versions of the ancestor they are researching. The user may specify filter 504*b* to indicate that only tree persons with scores equal to or greater than 200 and qualities equal to or greater than 200 be used. Filter 504*b* causes Tree Person C5 (quality not greater than 200) and Tree Person E135 (both quality and score not greater than 200) to be excluded from Cluster View Person 1000. The remaining tree persons from tree persons 502*b* are included in Cluster View Person 1000.

In FIG. 5C, a user may decide that they want to view a low number of possible versions of the ancestor they are researching. The user may specify filter 504*c* to indicate that only tree persons with scores equal to or greater than 500 and qualities equal to or greater than 500 be used. Filter 504*c* causes Tree Persons B13, C5, D45, and E135 to be excluded from Cluster View Person 1000. The remaining tree persons from tree persons 502*c*, Tree Persons A15 and F287, are included in Cluster View Person 1000.

The cluster view person may dynamically scale as the selected filter changes and/or as changes occur within a genealogical database. For example, in some embodiments a user may use a slider input to dynamically change a filter setting over a continuous range and watch the cluster view person automatically adjust in real time to the changes. In some embodiments, a first user may observe a cluster view person dynamically change as a second user modifies a tree person that is included in the cluster view person. In some genealogical databases, a system called the "Stitch System" may be tasked with identifying similar tree persons to define clusters. As changes occur for tree persons, such as the spelling of a name or the addition of a relationship, the clusters that the tree person is a member of are identified and the cluster view person is updated. Similarly, as tree persons are added or removed from clusters, the cluster view person is updated.

When a user requests a cluster view person, they may specify the minimum score (similarity) and quality of the tree persons allowed in the view. In some embodiments, to produce this view, a copy of the cluster view person is read from a database and all tree persons that do not meet the specified similarity and quality criteria are disassociated from the attributes they contributed to the cluster view person. Then, all attributes that do not have any remaining associations with tree persons are removed as they were contributed only by tree persons that did not meet the user's criteria.

Figure 6:
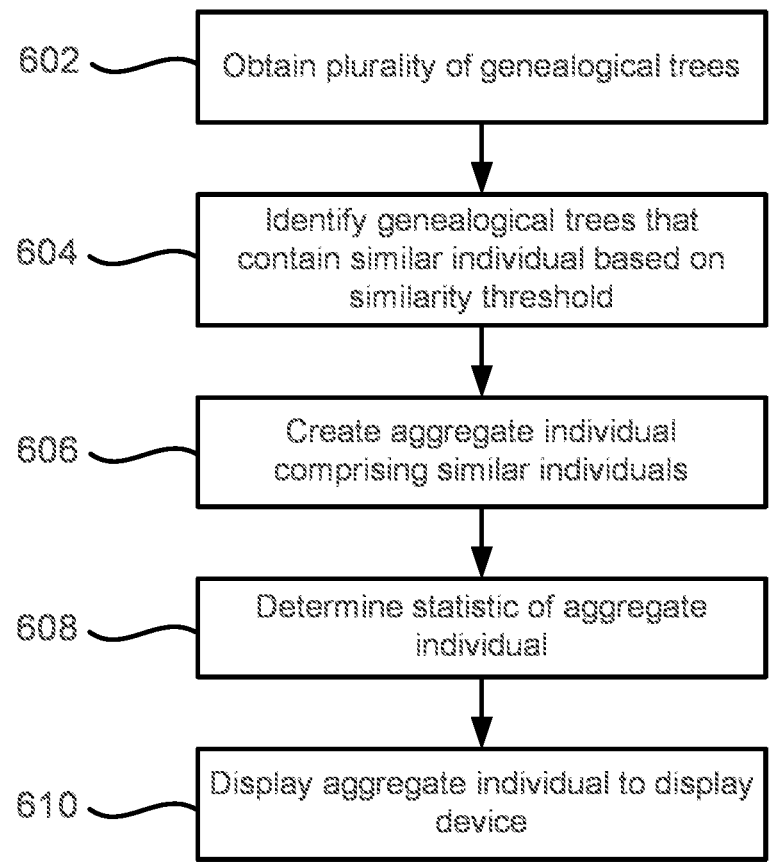
FIG. 6 illustrates a process for creating a cluster view person, according to an embodiment of the present disclosure.

FIG. 6 illustrates a process for creating a cluster view person, according to an embodiment of the present disclosure. At step 602, a plurality of genealogical trees are obtained. At step 604, genealogical trees that contain a similar individual are identified. Two different individuals in two different genealogical trees are determined to be similar based on a comparison between the two different individuals and a similarity threshold. For example, in some embodiments, a similarity threshold may be such that two different individuals are determined to be similar when they have the same date of birth and the same date of death, regardless of their names. In other embodiments, a similarity threshold may be such that two different individuals are determined to be similar when they have 90% of the letters of both their first names and last names in common and at least a date of birth in common or a date of death in common. In other embodiments, a similarity threshold may be such that two different individuals are determined to be similar when they have 90% of the letters of both their first names and last names in common and at least one other direct relative with 90% of the letters of both their first names and last names in common.

In some embodiments, the determination that two individuals are similar may also be based on a quality threshold. For example, although a certain tree person may be identical to another tree person in another tree, if the certain tree person has very few historical records and other evidence in support of it, a user may specify a quality threshold such that the two tree persons are not determined to be similar. For example, in some embodiments, a quality threshold may be such that two different individuals are not determined to be similar when one of them has less than 10 historical records in support of it. In other embodiments, a quality threshold may be such that two different individuals are not determined to be similar when one of them has only one type of historical record in support of it, such as census data.

At step 606, an aggregate individual comprising each of the similar individuals is created. The aggregate individual may be similar or identical to the cluster view persons described herein. In some embodiments, the creation of the aggregate individual includes applying a view filter to a cluster such that tree persons within the cluster are aggregated according to the threshold and/or filter in place. In some embodiments, the creation of the aggregate individual includes the creation of a new data structure that is entirely different from the cluster.

At step 608, a statistic of the combined information from each of the similar individuals is determined. The statistic may include the frequency of each information in different tree persons, or may include more advanced calculations such as probabilities. At step 610, the aggregate individual may be displayed to a display device. In some embodiments, the aggregate individual is displayed by displaying the statistic. The statistic may be displayed by outputting a graph, chart, table, and/or list to the display device. For example, a histogram of the possible names for an individual may be outputted to the display device.

Optimized Index Storage

In order for genealogical databases to allow users to search through huge numbers of trees and tree persons for ancestors that meet specified similarity and quality thresholds, faster and more efficient searching techniques are needed. Usage of an optimized index storage may increase speeds for an end user and decrease the overall burden on the database.

More specifically, in data-querying scenarios where a result is excluded or returned based on whether any subordinate items meet or exceed a combination of quantitatively-compared criteria, the time to traverse a large set of subordinate items for each potential result can be unacceptably slow, or the storage space required to keep all subordinate items available for query-traversal, whether on physical disk or in memory, can be unaffordable. The optimized index storage described below reduces the storage requirements and improves the performance of these queries.

Figure 7:
FIG. 7 illustrates a data set, according to an embodiment of the present disclosure.

FIG. 7 illustrates a data set 700, according to an embodiment of the present disclosure. Data set 700 includes Item A with Sub-Items 1-7 and Item B with Sub-Items 8-14. Each sub-item has a specified score and quality. When a query is made for items that have any sub-item with a score greater than 79 and a quality greater than 59, the query would return Item A but not Item B. An index may be created to support this query and queries similar to it by storing only the logically necessary sub-items for each item.

Figure 8:
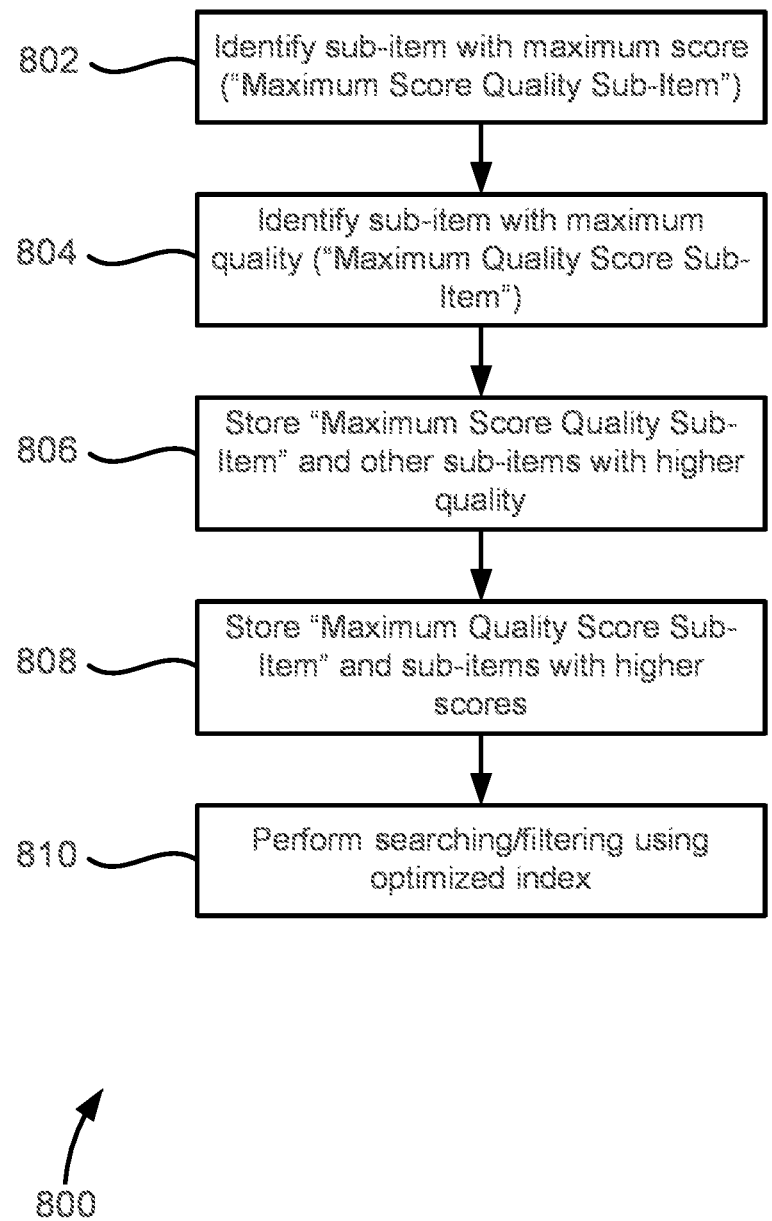
FIG. 8 illustrates a process for creating an optimized index, according to an embodiment of the present disclosure.

FIG. 8 illustrates a process 800 for creating an optimized index, according to an embodiment of the present disclosure. At step 802, the sub-item with the maximum score is identified. If there are multiple sub-items with the same maximum score, then the one with the highest quality is used. This sub-item is called the "Maximum Score Quality Sub-Item" of the item. The "Maximum Score Quality Sub-Item" for Item A is Sub-Item 1 and for Item B is Sub-Item 8.

At step 804, the sub-item with the maximum quality is identified. If there are multiple sub-items with the same maximum quality, then the one with the highest score is used. This sub-item is called the "Maximum Quality Score Sub-Item" of the item. The "Maximum Quality Score Sub-Item" for Item A is Sub-Item 1 and for Item B is Sub-Item 14.

At step 806, the sub-item that is the "Maximum Score Quality Sub-Item" is stored along with any other sub-items that have a higher quality than the "Maximum Score Quality Sub-Item". At step 808, the sub-item that is the "Maximum Quality Score Sub-Item" is stored along with any other sub-items that have a higher score than the "Maximum Quality Score Sub-Item". At step 810, searching and/or filtering is performed using the optimized index instead of the original data set.

Figure 9:
FIG. 9 illustrates an optimized index, according to an embodiment of the present disclosure.

FIG. 9 illustrates an optimized index 900, according to an embodiment of the present disclosure. Performance of process 800 on data set 700 yields optimized index 900, containing Sub-Items 1, 8, 9, 10, 11, and 14. Sub-Items 1 and 8 were stored because they were the "Maximum Score Quality Sub-Item" for Items A and B, respectively. Sub-Item 14 was stored because it was the "Maximum Quality Score Sub-Item" for Item A. Sub-Items 9, 10, and 11 were stored because they had higher scores than Sub-Item 14.

With optimized index 900, queries can be performed against a smaller set of data and can yield the same results as if they were performed against all the values in the original data set. This technique also applies to data sets with more than two quantitatively-compared fields. For example, data sets may have more than two quantitative attributes on a single sub-item, such as score, quality, and completeness. Furthermore, data sets comprising items with sub-items, sub-sub-items, and sub-sub-sub-items (etc.) can be simplified into an optimized index using a process similar to process 800.

Simplified Computer System

Figure 10:
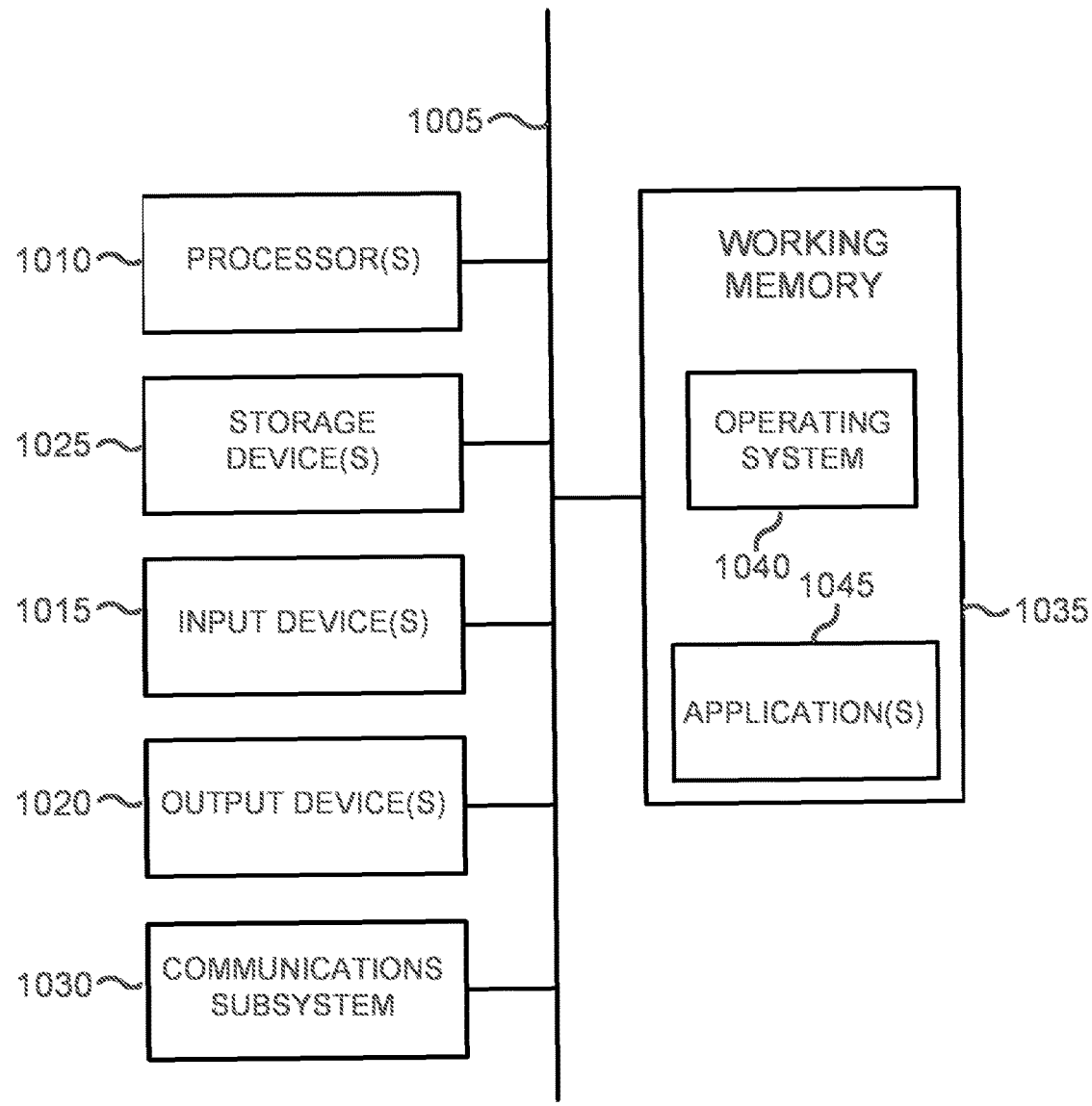
FIG. 10 illustrates a simplified computer system, according to an embodiment of the present disclosure.

FIG. 10 shows a simplified computer system 1000, according to some embodiments of the present disclosure. A computer system 1000 as illustrated in FIG. 10 may be incorporated into devices such as a portable electronic device, mobile phone, or other device as described herein. FIG. 10 provides a schematic illustration of one embodiment of a computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include without limitation a mouse, a keyboard, a camera, and/or the like; and one or more output devices 1020, which can include without limitation a display device, a printer, and/or the like.

The computer system 1000 may further include and/or be in communication with one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1030 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1030. In other embodiments, a portable electronic device, e.g. the first electronic device, may be incorporated into the computer system 1000, e.g., an electronic device as an input device 1015. In some embodiments, the computer system 1000 will further comprise a working memory 1035, which can include a RAM or ROM device, as described above.

The computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1000 to perform methods in accordance with various embodiments of the technology. According to a set of embodiments, some or all of the procedures of such methods are performed by the computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method for creating an index storage to reduce memory storage requirement of a genealogical tree database that is filterable by dynamic values, the method comprising:
   accessing, from a storage medium configured for storing a genealogical dataset, a full index, wherein:
      the genealogical dataset comprises a plurality of tree clusters and a plurality of tree persons, wherein the plurality of tree persons are arranged in hierarchy and one of more tree persons have sub tree persons under the hierarchy; and
      each tree person in a particular tree cluster is associated with a first-metric score and a second-metric score, wherein the first-metric score is determined based at least in part on a distance between the tree person and a reference point of the tree cluster, and the second-metric score is determined based at least in part on a quantity of historical records in support of the tree person being in the particular tree cluster;
   creating a simplified index for storage in memory, the simplified index searchable for tree persons and filterable through dynamic values of metric scores of sub tree persons corresponding to each main tree person arranged in the hierarchy, wherein creating the simplified index comprises:
      for at least a particular tree person having a plurality of sub tree persons, identifying a first sub tree person having a highest first-metric score relative to the plurality of sub tree persons under the particular tree person;
      identifying a second sub tree person in the particular tree cluster having a highest second-metric score relative to the plurality of sub tree persons under the particular tree person in the hierarchy; and
      generating a simplified index instance corresponding to the particular tree person, wherein generating the simplified index instance corresponding to the particular tree person comprises:
         storing, in the simplified index instance, the first sub tree person and any sub tree persons under the particular tree person in the hierarchy having a higher second-metric score than the first sub tree person, and
         storing, in the simplified index instance, the second sub tree person and any sub tree persons under the particular tree person in the hierarchy having a higher first-metric score than the second sub tree person;
      storing the simplified index instance in the simplified index;
      repeating generating of additional simplified index instances for additional tree persons in the full index; and
      storing the additional simplified index instances to the simplified index, wherein the simplified index has a reduced memory storage requirement than the full index.

2. The computer-implemented method of claim 1, wherein the first-metric score for each sub tree person is a similarity score between said each sub tree person and the reference point, and the second-metric score for each sub tree person is a quality score based on the quantity of historical records in support of the sub tree person being in the particular tree cluster and quality of the historical records.

3. The computer-implemented method of claim 1, further comprising:
   receiving a search query for tree clusters comprising one or more tree persons at or above a specified first-metric threshold and a specified second-metric threshold;
   searching the index for tree clusters above the first-metric threshold and the second-metric threshold; and
   retrieving, from the storage medium, the tree clusters above the first-metric threshold and the second-metric threshold.

4. The computer-implemented method of claim 1, wherein the genealogical dataset comprises a plurality of tree clusters each comprising a plurality of tree persons; and
   wherein the method is performed for each tree cluster in the genealogical dataset.

5. The computer-implemented method of claim 4, wherein the simplified index includes the first tree person and any tree persons having a higher second-metric score than the first tree person, and the second tree person and any tree persons having a higher first-metric score than the second tree person.

6. The computer-implemented method of claim 1, further comprising:

determining that a subset of the plurality of sub tree persons have a same, highest score of the first- or second-metric scores; and selecting a sub tree person of the subset of the plurality of sub tree persons with the highest score for the other of the first- or second-metric scores.

7. The computer-implemented method of claim 1, wherein each of the tree persons of the plurality of tree persons is associated with scores corresponding to three or more metrics, the method further comprising:

identifying a third tree person having a highest third-metric score relative to the plurality of tree persons;

storing, in the index, the first tree person and any sub tree persons having a higher second-metric score or third-metric score than the first tree person, the second tree person and any sub tree persons having a higher first-metric score or third-metric score than the second tree person, and the third tree person and any sub tree persons having a higher first-metric score or second-metric score; and receiving a search query for tree clusters comprising one or more tree persons at or above a specified first-, second-, and third-metric threshold;

searching only the index for tree clusters having one or more tree persons at or above the first-, second-, and third-metric thresholds; and retrieving, from the index, the tree clusters having the one or more tree persons at or above the first-, second-, and third-metric thresholds.

8. A non-transitory computer readable storage media comprising instructions for creating an index storage to reduce memory storage requirement of a genealogical tree database that is filterable by dynamic values, wherein the instructions, when executed by one or more processors, cause the one or more processors to perform operations comprising:

access, from a storage medium configured for storing a genealogical dataset, a full index, wherein:

the genealogical dataset comprises a plurality of tree clusters and a plurality of tree persons, wherein the plurality of tree persons are arranged in hierarchy and one of more tree persons have sub tree persons under the hierarchy; and each tree person in a particular tree cluster is associated with a first-metric score and a second-metric score, wherein the first-metric score is determined based at least in part on a distance between the tree person and a reference point of the tree cluster, and the second-metric score is determined based at least in part on a quantity of historical records in support of the tree person being in the particular tree cluster;

create a simplified index for storage in memory, the simplified index searchable for tree persons and filterable through dynamic values of metric scores of sub tree persons corresponding to each main tree person arranged in the hierarchy, wherein creating the simplified index comprises:

for at least a particular tree person having a plurality of sub tree persons, identifying a first sub tree person having a highest first-metric score relative to the plurality of sub tree persons under the particular tree person;

identify a second sub tree person in the particular tree cluster having a highest second-metric score relative to the plurality of sub tree persons under the particular tree person in the hierarchy; and generate a simplified index instance corresponding to the particular tree person, wherein generating the simplified index instance corresponding to the particular tree person comprises:

store, in the simplified index instance, the first sub tree person and any sub tree persons under the particular tree person in the hierarchy having a higher second-metric score than the first sub tree person, and store, in the simplified index instance, the second sub tree person and any sub tree persons under the particular tree person in the hierarchy having a higher first-metric score than the second sub tree person;

store the simplified index instance in the simplified index;

repeat generating of additional simplified index instances for additional tree persons in the full index; and store the additional simplified index instances to the simplified index, wherein the simplified index has a reduced memory storage requirement than the full index.

9. The non-transitory computer readable storage media of claim 8, wherein the first-metric score for each sub tree person is a similarity score between said each sub tree person and the reference point, and the second-metric score for each sub tree person is a quality score based on the quantity of historical records in support of the sub tree person being in the particular tree cluster and quality of the historical records.

10. The non-transitory computer readable storage media of claim 8, wherein the operations further comprise:

receive a search query for tree clusters comprising one or more tree persons at or above a specified first-metric threshold and a specified second-metric threshold;

search the index for tree clusters above the first-metric threshold and the second-metric threshold; and retrieve, from the storage medium, the tree clusters above the first-metric threshold and the second-metric threshold.

11. The non-transitory computer readable storage media of claim 8, wherein the genealogical dataset comprises a plurality of tree clusters each comprising a plurality of tree persons; and wherein the operations are performed for each tree cluster in the genealogical dataset.

12. The non-transitory computer readable storage media of claim 11, wherein the simplified index includes the first tree person and any tree persons having a higher second-metric score than the first tree person, and the second tree person and any tree persons having a higher first-metric score than the second tree person.

13. The non-transitory computer readable storage media of claim 8, wherein the operations further comprise:

determining that a subset of the plurality of sub tree persons have a same, highest score of the first- or second-metric scores; and selecting a sub tree person of the subset of the plurality of sub tree persons with the highest score for the other of the first- or second-metric scores.

14. The non-transitory computer readable storage media of claim 8, wherein at least one tree person represents an aggregate tree person and the plurality of tree persons represent respective individual tree persons of a stitched genealogical tree database clustered together in the aggregate tree person based on a likelihood of representing a same person.

15. A system for creating an index storage to reduce memory storage requirement of a genealogical tree database that is filterable by dynamic values, the system comprising:
one or more processors; and
one or more computer readable storage mediums comprising instructions that, when executed by the one or more processors, cause the one or more processors to perform operations comprising:
accessing, from a storage medium configured for storing a genealogical dataset, a full index, wherein:
the genealogical dataset comprises a plurality of tree clusters and a plurality of tree persons, wherein the plurality of tree persons are arranged in hierarchy and one of more tree persons have sub tree persons under the hierarchy; and
each tree person in a particular tree cluster is associated with a first-metric score and a second-metric score, wherein the first-metric score is determined based at least in part on a distance between the tree person and a reference point of the tree cluster, and the second-metric score is determined based at least in part on a quantity of historical records in support of the tree person being in the particular tree cluster;
creating a simplified index for storage in memory, the simplified index searchable for tree persons and filterable through dynamic values of metric scores of sub tree persons corresponding to each main tree person arranged in the hierarchy, wherein creating the simplified index comprises:
for at least a particular tree person having a plurality of sub tree persons, identifying a first sub tree person having a highest first-metric score relative to the plurality of sub tree persons under the particular tree person;
identifying a second sub tree person in the particular tree cluster having a highest second-metric score relative to the plurality of sub tree persons under the particular tree person in the hierarchy; and
generating a simplified index instance corresponding to the particular tree person, wherein generating the simplified index instance corresponding to the particular tree person comprises:
storing, in the simplified index instance, the first sub tree person and any sub tree persons under the particular tree person in the hierarchy having a higher second-metric score than the first sub tree person, and
storing, in the simplified index instance, the second sub tree person and any sub tree persons under the particular tree person in the hierarchy having a higher first-metric score than the second sub tree person;
storing the simplified index instance in the simplified index;
repeating generating of additional simplified index instances for additional tree persons in the full index; and
storing the additional simplified index instances to the simplified index, wherein the simplified index has a reduced memory storage requirement than the full index.

16. The system of claim 15, wherein the first-metric score for each sub tree person is a similarity score between said each sub tree person and the reference point, and the second-metric score for each sub tree person is a quality score based on the quantity of historical records in support of the sub tree person being in the particular tree cluster and quality of the historical records.

17. The system of claim 15, wherein the operations further comprise:
receiving a search query for tree clusters comprising one or more tree persons at or above a specified first-metric threshold and a specified second-metric threshold;
searching the index for tree clusters above the first-metric threshold and the second-metric threshold; and
retrieving, from the storage medium, the tree clusters above the first-metric threshold and the second-metric threshold.

18. The system of claim 15, wherein the genealogical dataset comprises a plurality of tree clusters each comprising a plurality of tree persons; and
wherein the operations are performed for each tree cluster in the genealogical dataset.

19. The system of claim 18, wherein at least one tree person represents an aggregate tree person and the plurality of tree persons represent respective individual tree persons of a stitched genealogical tree database clustered together in the aggregate tree person based on a likelihood of representing a same person.

20. The system of claim 15, wherein the simplified index is smaller than total storage space of the storage medium.

* * * * *